US008488448B2

(12) United States Patent
Kolakeri et al.

(10) Patent No.: US 8,488,448 B2
(45) Date of Patent: Jul. 16, 2013

(54) SYSTEM AND METHOD FOR MESSAGE SEQUENCING IN A BROADBAND GATEWAY

(75) Inventors: Shiv Nayak Kolakeri, Tampa, FL (US);
Abhitabh Kushwaha, Tampa, FL (US);
Sameer N. Dharmadhikari, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 511 days.

(21) Appl. No.: 11/862,123

(22) Filed: Sep. 26, 2007

(65) Prior Publication Data
US 2009/0080432 A1 Mar. 26, 2009

(51) Int. Cl.
*H04J 1/16* (2006.01)
*H04J 3/14* (2006.01)
*H04L 1/00* (2006.01)
*H04L 12/26* (2006.01)
*G06F 15/173* (2006.01)

(52) U.S. Cl.
USPC ........... 370/229; 370/230; 370/231; 709/223; 709/224; 709/225; 709/226

(58) Field of Classification Search
USPC ................. 709/223, 224, 225, 226; 370/229, 370/230, 231
See application file for complete search history.

(56) References Cited

U.S. PATENT DOCUMENTS

| | | | | |
|---|---|---|---|---|
| 5,418,888 | A | * | 5/1995 | Alden ............................. 706/48 |
| 8,015,183 | B2 | * | 9/2011 | Frank ............................ 707/724 |
| 2006/0166623 | A1 | * | 7/2006 | Huuhtanen et al. ......... 455/67.11 |
| 2008/0175255 | A1 | * | 7/2008 | Krstulich et al. ............. 370/401 |

OTHER PUBLICATIONS

CNET, EarthLink DSL Review, Oct. 7, 2005, CNET, all pages.*

\* cited by examiner

*Primary Examiner* — Kwang B Yao
*Assistant Examiner* — Adam Duda

(57) ABSTRACT

A system and method for message sequencing in a broadband gateway comprising a receiver to receive two or more messages, a data storage system to store the two or more messages, an identifier to identify a processing sequence for the two or more messages, and a retriever to retrieve the two or more messages for processing based on the identified processing sequence for providing broadband DSL service to a customer.

23 Claims, 11 Drawing Sheets

SYSTEM AND METHOD FOR MESSAGE SEQUENCING IN A BROADBAND GATEWAY

BACKGROUND INFORMATION

Demand for in-home data and telephony services has grown dramatically in recent years and is expected to continue to increase. Accordingly, providers of data and telephony services have sought to design and deploy broadband networks with increased delivery capacity. One broadband technology that has become particularly popular, for example, is digital subscriber lines (DSL). As demand for DSL service has grown, service providers have needed to build out infrastructure for providing DSL service. One aspect of DSL network maintenance that has proven particularly cumbersome is provisioning of DSL services. Generally, in order to provide service to a customer, numerous network elements need to be configured to create a communication path, which may be referred to as a permanent virtual circuit (PVC), from the customer through the DSL network to an Internet service provider (ISP) or network service provider (NSP). Processing an order for DSL service and configuring the network elements to create the PVC is often referred to as "provisioning." However, delays and failures associated with provisioning are often experienced because the process involves numerous computerized systems, configuring many network elements to establish a PVC from the end user to an asynchronous transfer mode (ATM) or internet protocol (IP) network, and configuring still more network elements to complete the PVC through an ATM/IP network to an ISP/NSP. Therefore, quickly identifying points of failure in processing an order is essential for efficient operation of a DSL network and to meet customer expectations. The fact that such transactions are becoming increasingly high in volume and are often processed by multiple network components further complicates the provisioning process. As a result, current broadband provisioning and activation techniques are hard-pressed to efficiently manage all inbound and outbound communications to ensure delivery of messages in sequence.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Exemplary embodiments may provide message processing in a broadband gateway. For example, a system and method for processing messages in a broadband assignment activation and inventory system (BAAIS) gateway may be provided. That is, exemplary embodiments may, among other things, expand the provisioning and activation of broadband networks (e.g., DSL provisioning and service) to a multi-protocol, multi-format, multi-interface, message processing, routing, and distributing system and method. Moreover, exemplary embodiments may provide a single point of entry and exit for all inbound and outbound communication between external systems and native multiple instances that exist on a per region basis in a manner that is efficient and optimizes network utility.

Figure 1:
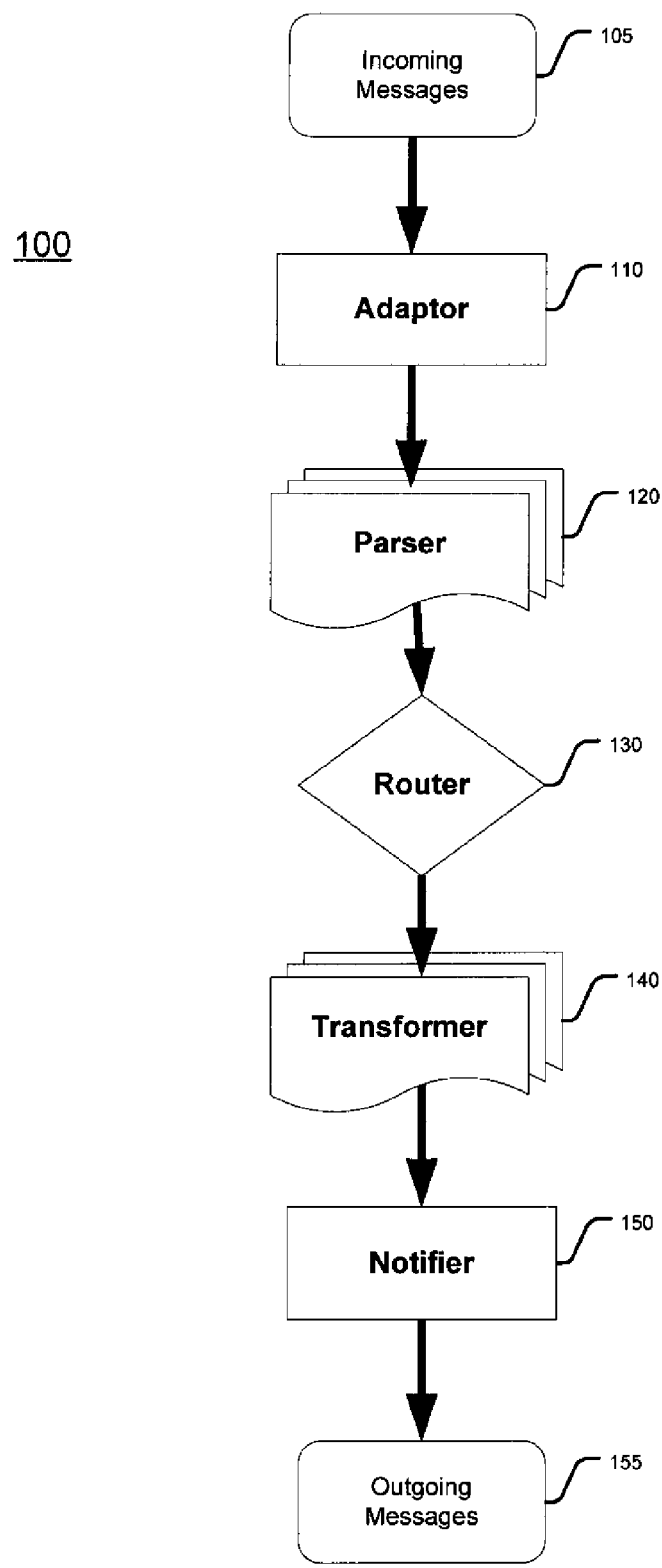
FIG. 1 depicts a broadband gateway architecture for message processing, according to an exemplary embodiment.

FIG. 1 depicts a broadband gateway architecture 100 for message processing, according to an exemplary embodiment. The exemplary gateway architecture 100 is provided by way of example, as there are a variety of architectures and components capable of carrying out methods disclosed herein. The gateway 100 shown in FIG. 1 may be executed or otherwise performed by one or a combination of various modules and/or servers. Each block shown in FIG. 1 represents one or more processes, methods, modules, or subroutines carried in the exemplary gateway 100.

Referring to FIG. 1, the broadband gateway 100 may be a broadband assignment activation and inventory system (BAAIS) gateway and may include several modules for processing incoming messages 105, (e.g., service requests or orders). In one embodiment, the broadband gateway 100 may include an adapter module 110, a parser module 120, a router module 130, a transformer module 140, and a notifier module 150. After receiving and processing incoming messages 105, the broadband gateway 100 may dispatch outgoing messages 155 to complete broadband provisioning. See also, for example, co-pending U.S. patent application Ser. No. 11/861,533, entitled "System and Method for Message Processing in a Broadband Gateway," filed Sep. 26, 2007, which is hereby incorporated by reference in its entirety.

Although each of the modules of the broadband gateway 100 is depicted as a single module in FIG. 1, it should be appreciated that each module may be combined into greater or fewer numbers. The modules may be local, remote, or a combination thereof to each other. It should also be appreciated that the modules of the broadband gateway 100 may also be coupled to one or more data storage systems and/or servers (not shown). These one or more data storage systems and/or servers may store and process relevant information received from one or more service clients and/or other message senders. Exemplary information may include requests for broadband service, such as DSL, but may also include provisioning of other offered services. It should be appreciated that the one or more data storage systems and/or servers may be combined into fewer or greater numbers of data storage systems and/or servers to store and process the received information. Furthermore, the data storage systems and/or servers may be local, remote, or a combination thereof to each other. Additionally, the databases and/or servers may also store and process additional relevant information which may further relate to provisioning or other similar services, such personal service client information or information found in metadata. Other variations may also be provided.

It should also be appreciated by one of ordinary skill that each of the modules, data storages systems, and/or servers may include one or more processors (not shown) for processing one or more messages. The data and/or information in each of the one or more messages or orders may be processed for storage, indexing, interpretation, and/or conversion (transformation) by one or more processors of the modules. By storing, indexing, interpreting, and/or converting the data/information in one or more of the message at the one or more modules of the broadband gateway 100, the data/information may be shared by multiple modules. Such use may be sequential or simultaneous. Furthermore, processing the data/information in this way may also allow the processing logic to cross-reference the various data/information for efficient use by the system. Other various embodiments may also be provided.

Referring back to FIG. 1, the adapter module 110 may receive one or more incoming messages 105 to request or order broadband service. Once the one or more incoming messages 105 are received, the adapter module 110 may accept the one or more incoming messages 105 and store and "persist" the one or more messages 105 in one or more databases (not shown). Without this "persistence" capability, data may exist only in memory (e.g., RAM) and may be lost when the memory loses power, such as on computer shutdown. As a result, persisting the one or more messages 105 may provide the ability to retain data structures between program executions, such as, for example, from one module to another module in the broadband gateway 100. The adapter module 110 may also send an acknowledgment (ACK) to one or more senders (e.g., customers or clients requesting broadband service) to confirm receipt of the one or more messages 105.

Figure 2:
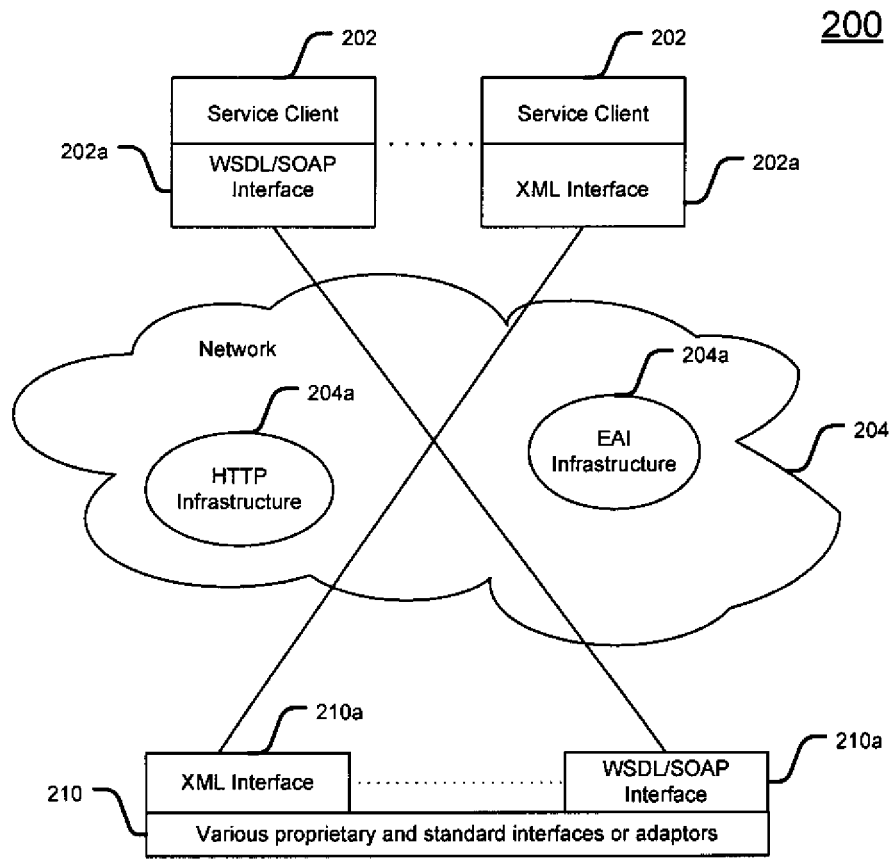
FIG. 2 depicts an architecture of receiving messages in a broadband gateway, according to an exemplary embodiment.

FIG. 2 depicts an architecture for receiving messages in a broadband gateway 200, according to an exemplary embodiment. For example, the adaptor module 110 may receive messages in a broadband gateway 200. The exemplary architecture 200 is provided by way of example, as there are a variety of architectures and components capable of carrying out methods disclosed herein. The gateway 200 shown in FIG. 2 may be executed or otherwise performed by one or a combination of various components, networks, modules, servers, and/or interfaces. Other various embodiments may also be provided.

Referring to FIG. 2, one or more service clients 202 may include one or more service client interfaces 202a. Each of the one or more service client interfaces 202a may support a variety of different formats/protocols, such as web services definition/description language (WSDL), simple object access protocol (SOAP), or extensible markup language (XML). Other various formats/protocols may also include messaging and queuing (MQ) interface, Java message service (JMS), hypertext transfer protocol secure (HTTPS), file transfer protocol (FTP), simple mail transfer protocol (SMTP), common object request broker architecture (CORBA), technical and office protocol communication (TOPCOM), etc. Depending on the one or more service clients 202, these one or more service client interfaces 202a may send and/or receive messages through a network 204. The network 204 may support various infrastructures 204a, such as HTTP or enterprise application integration (EAI). One or more adaptor modules 210 may receive the one or more messages 105 from the one or more service clients 202. In one embodiment, the one or more adapter modules 210 may include one or more adapter interfaces 210a, which are configured to support a variety of formats and/or protocols similar to that of the one or more service client interfaces 202a. As a result, the one or more adaptor modules 210 may provide not only flexibility to accommodate disparate systems, but also future growth with newer and evolving, Other various embodiments may also be provided.

It should also be appreciated that the adaptor module 110 may be deployed on J2EE architecture component Service Layer Session Bean (SLSB) or other similar architecture. Additionally, the adaptor module 110 may employ clustering and/or instance pooling. This may be achieved by creating a pool of multiple instances of the module per JVM, in one or more JVMs (thereby resulting in a cluster). This may provide efficient utilization of server and system resources by promoting concurrent and parallel processing to avoid system or processing contention issues. Other various embodiments may also be provided.

Figure 3:
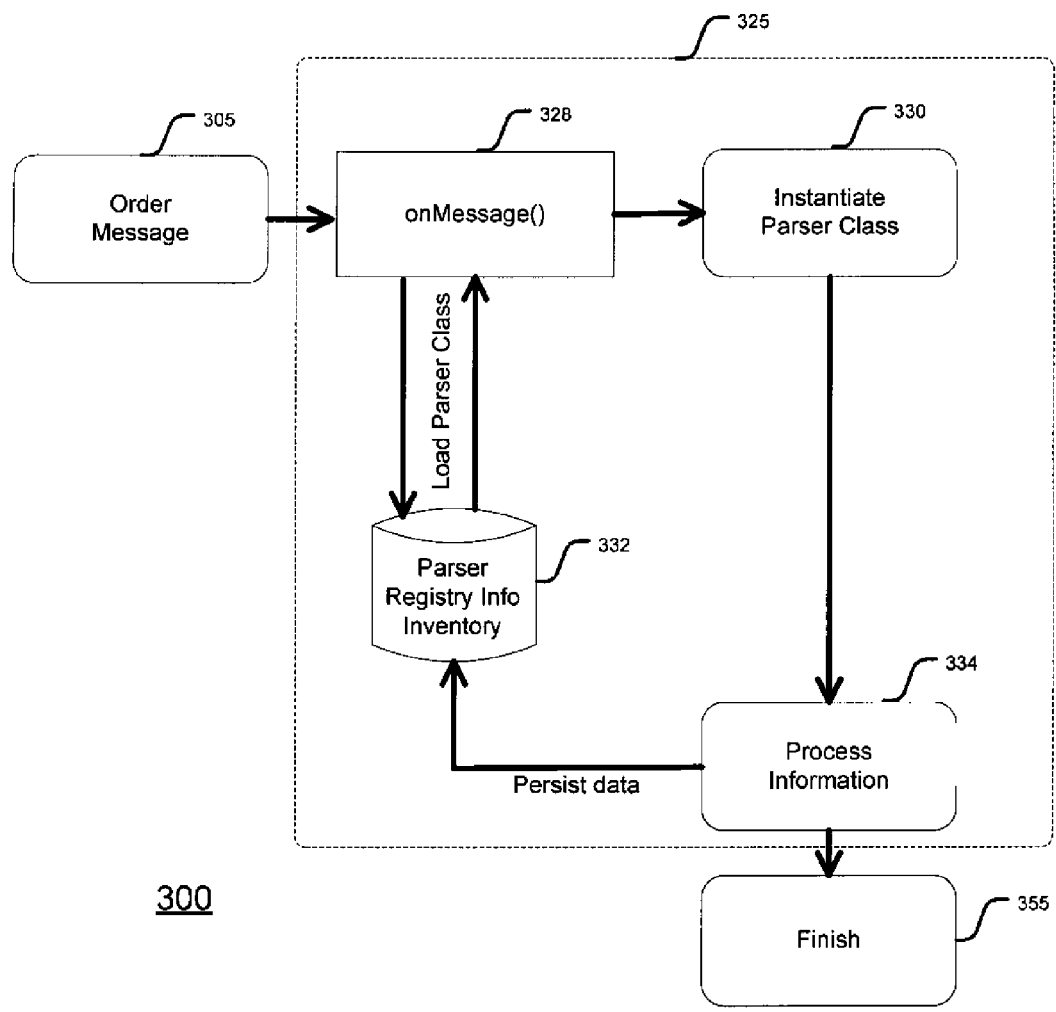
FIG. 3 depicts a flowchart of parsing messages in a broadband gateway, according to an exemplary embodiment.

FIG. 3 depicts a flowchart of parsing messages in a broadband gateway 300, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 200. A computer readable media comprising code to perform the acts of the method 300 may also be provided.

Referring to FIG. 3, once the one or more messages 105 pass through the adapter module 110, the parser module 120 may retrieve these messages 105 as order messages 305 for interpreting and parsing utilizing parsing logic 325. The parsing logic 325 may further include several components. For example, an onMessage( ) 328 may be an entry point for parsing and may obtain a parser class for the order messages 305 being processed. An Instantiate Parser Class 330 may load a transformer class. A Parser Registry Inventory 332 may be a repository, e.g., one or more data storage systems or databases, for storing contents of order messages 305 being parsed. A Process Information 334 may be the core step and/or component where parsing occurs. Other various embodiments may also be provided.

In one embodiment, the parser module 120 may utilize a parallel distributed model to distribute load across one or more application server instances while providing a single virtual interface. In another embodiment, the parser module 120 may include a messaging-based distributed model, in which one or more messages 105 may be distributed from the adapter module (or corresponding database) to a queue at the parser module 120. For instance, this may be achieved over a Java Message Service (JMS) architecture or other similar architectural platform. A distributed asynchronous architecture between the adapter module 110 and the parser module 120 may ensure that both modules work independent of each other and thereby providing improved throughput to any external system.

However, it should be appreciated that when multiple messages coming in from external systems are processed within a distributed architecture having multiple Java Virtual Machines (JVM), the order of processing the messages is not inherent or typically preserved. In other words, messages received in a certain order (e.g., M1-M2-M3-M4) may be committed out of sequence if message M1 takes a long time to process and message M2 is much quicker to process. In this example, message M2 may be processed before message M1 in a typical distributed architecture.

As a result, before message parsing occurs, message sequencing may also be preserved at a sequencing module (not shown) without sacrificing the benefits of a decoupled broadband gateway architecture (e.g., scalability, performance, and reliability). In one embodiment, the sequencing module may sequence messages by at least one of in-coming system name, event type, and source system time. Other various sequencing elements may also be provided. Additionally, the sequencing module may include built-in message validation rules for meeting message formats and message components requirements. Another embodiment may include built-in support for region specific parsing classes (e.g., a "DSL Order Northeast Parser" which may differ from a "DSL Order New York Parser") to support multiple versioning and various geographical sites. Message sequencing may help ensure that service order requests are parsed and persisted in one or more databases for optimum network utility and serviceability.

Sequencing may be important in the event of failure in processing one or more messages. For example, sequencing may help ensure provisioning steps or other processing actions occur in a correct order. Furthermore, sequencing may help to ensure that every step is accounted for. Even in the event multiple instances are servicing a queue, a sequencing feature may serve to prevent out of order actions and/or duplication of other processing actions. In the event of failure, sequencing may provide a way to verify which steps/actions have been successfully completed (e.g., received from the parser module 120 or other module). In other words, sequencing may provide a "checklist" to ensure proper processing of messages.

In one embodiment, for each service order, a backend provisioning engine may generate events and/or messages to the broadband gateway 100. The broadband gateway 100 may then be required to process each of these events and/or messages in a first-in, first-out (FIFO) sequence. Thus, as a part of processing, the broadband gateway 100 may generate (depending on various sequencing, business, or administrator-entered rules) events and/or messages that need to be delivered to external systems (e.g., to other modules/servers within the broadband gateway 100 or to systems/servers outside of the broadband gateway 100), also in the correct sequence.

For example, the following example may help define a sequencing requirement. In this example, for a service order A, a backend provisioning engine may generate ten (10) messages, e.g., M1, M2 through M10, one after another as part of an order workflow. The broadband gateway, through the sequencing module, may ensure that messages M1, M2 through M10 are processed in the same sequence (e.g., message M2 never processed before message M1, etc.). It should be appreciated that the processing order may not mean that messages M1 through M10 will get delivered to the broadband gateway processing server (e.g., router server 130) in the correct sequence. In fact, it is the processing sequence, not the delivery sequence that may get preserved. As part of processing a message, e.g., M2, the sequencing module may provide business or administrator rules to generate notification messages N1, N2, N3 to three different external systems, e.g., Sys 1, Sys 2 and Sys 3, respectively. As part of processing a message, e.g., M3, the sequencing module may provide business or administrator rules to generate notification messages N4, N5, N6 to the three different external systems, e.g., Sys 1, Sys 2 and Sys 3, respectively. Accordingly, in this scenario, the sequencing module may be required to deliver N1 before delivering N4 to external system Sys 1, deliver N2 before N5 to external system Sys 2, and deliver N3 before N6 to external system Sys 3 as part of the notification sequencing requirement to deliver messages in sequence for a given entity (in this case a service order). As a result, in order to meet this sequencing requirement and also come up with a solution that avoids database polling, which is resource intensive, certain rules may be further provided to ensure sequence processing for distributed, multi JVM messaging architecture.

In one embodiment, these rules may rely on a database set of tables and rules. Two rules designed for this purpose may include: (1) avoiding parallel processing of message in the event the message are to be processed in sequence and (2) delegating a next message call responsibility on "Processed Message" to ensure sequential message processing. As part of this design, for each message received and in the event sequencing is required, the sequencing module may create an entry in a sequence table, where the sequence table includes the following exemplary identifications (IDs) and/or keys to identify messages FIFO in a distributed architecture: "id," "ext_tran_id," "source_system," "seq_no," "time," etc. In this example, "id" may be a primary key and generated in the following format:

"Key"|"Transmitting System"|"Sequence Number," where Key may include an order number, transaction number, global information relating to sequencing, etc.

The "ext_tran_id" may be a Key for which messages are to be sequenced. The "source_system" may identify the system transmitting the message. The "seq_no," (e.g., seq_no 2) may provide auto numbering sequencing. The "time" may provide date and time information for which a message may be transmitted. [may be logged]. other various embodiments may also be provided.

Figure 4:
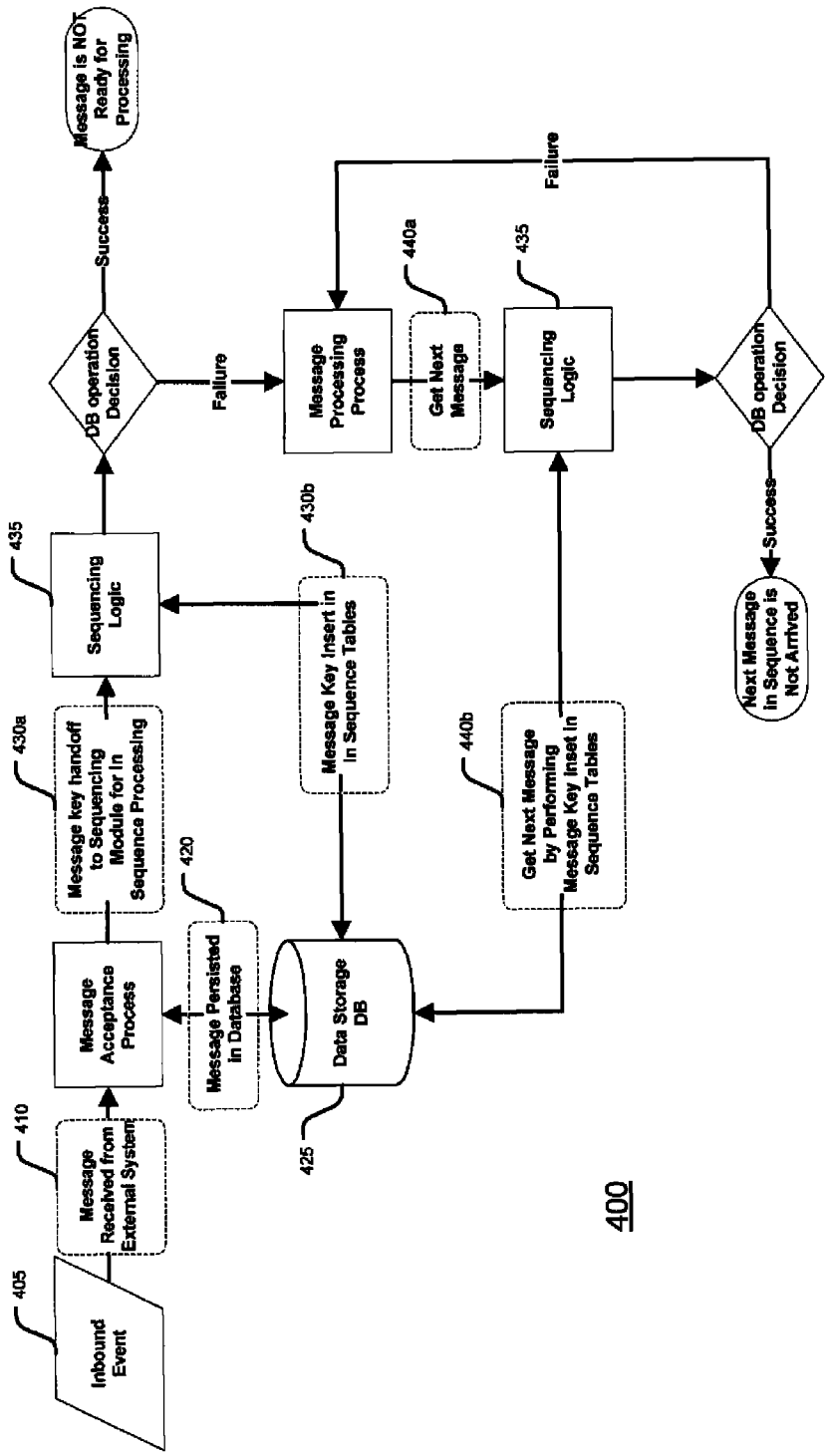
FIG. 4 depicts a flowchart of sequencing messages in a broadband gateway, according to an exemplary embodiment.

FIG. 4 depicts a flowchart of sequencing messages in a broadband gateway, according to an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by the system 100 shown in FIG. 1 by way of example, and various elements of the system 100 are referenced in explaining the example method of FIG. 4. Each block shown in FIG. 4 represents one or more processes, methods, or subroutines carried in the exemplary method 400. A computer readable media comprising code to perform the acts of the method 400 may also be provided. Referring to FIG. 4, the exemplary method 400 may begin at block 410.

At block 410, one or more messages or events 405 may be received. For example, at least one receiver at a sequencing module may receive one or more messages or events 405 from one or more external systems (e.g., senders, gateway modules, servers, etc.). In another embodiment, the one or more messages 405 may also be received in a sequential order.

At block 420, the one or more messages or events 405 may be stored (or persisted). For example, at least one data storage system 425 at the sequencing module may store (or persist) the one or more messages or events 405. In one embodiment, storing the one or more messages or events may include numbering the one or more messages/events based on the received sequential order. In another embodiment, the one or more messages may be numbered based on a delivered sequence. Other various embodiments may also be provided, such as automatic numbering or sequencing rules.

At block 430*a*, 430*b*, the one or more messages 405 may be sequenced or be identified for sequence. For example, at least one identifier (e.g., a sequencing module 435) at the sequencing module may identify a processing sequence for the one or more messages. In one embodiment, identifying the processing sequence may be based on the received or delivered sequential order. In another embodiment, identifying the processing sequence may be based on an independent sequential order governed by broadband gateway rules. In yet another embodiment, identifying the processing sequence for the one or more messages may be based on at least one of the following: a time of receipt, a time of delivering, a sending source, a transaction type, and an assigned number. In this example, one or more message keys may be inserted 430b in sequence tables for each of the one or more messages.

Additionally, identifying the processing sequence for the one or more messages may further include determining use of parallel processing or sequential message delegation. For instance, even though parallel processing may be avoided in the event messages are to be processed in sequence, as discussed above, parallel processing may still be employed to efficiently process messages as long as message are ultimately retrieved in sequence. In this example, messages M1, M2, and M3 may be parallel processed with messages M4, M5, and M6. In order to efficiently use network resource availability, M4 through M6 may processed quicker than M1 through M3. But as long as M1 through M3 is made available before M4 through M6 (which may be stored/persisted in one or more data storage systems), parallel processing may remain a viable sequencing option.

At block 440a, 440b, the one or more messages 405 may be retrieved for processing. For example, at least one retriever (e.g., the sequencing logic 435) at the sequencing module may retrieve the one or more messages 405 from the at least one data storage system 425 for further processing based on the identified processing without database polling. In one embodiment, sequential message delegation may be utilized to determine the next message in sequence and whether the next message in sequence as arrived or not. While the features and functionalities of message sequencing are primarily discussed with respect to the sequencing module above, it should be appreciated that the features and functionalities of one module may be similarly executed by other modules and/or other gateway components. It should also be appreciated that in another embodiment, method 400 may further include delivering the one or more messages 405 for further processing at one or more external systems.

Referring back to FIG. 3, once the sequencing module sequences the messages and once the parsing logic 325 of the parser module 120 completes its processing of an order message 305, the parser module 120 may output the message 355 for routing. Other various embodiments may also be provided.

Figure 5:
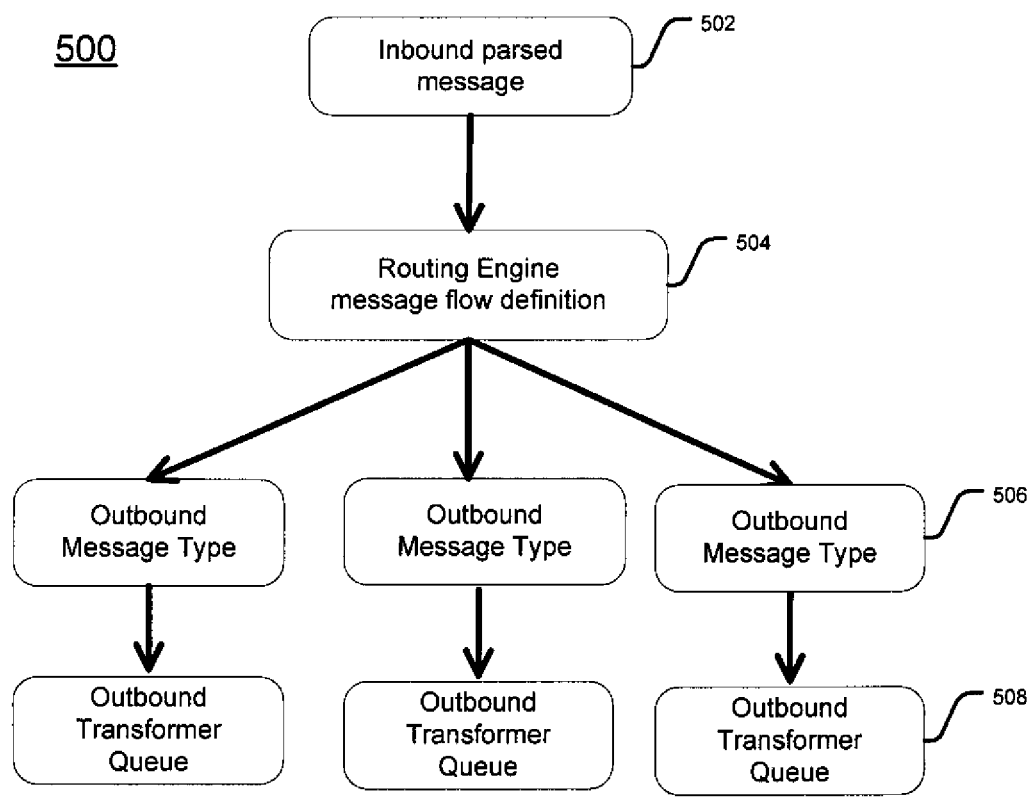
FIG. 5 depicts a flowchart of routing messages in a broadband gateway, according to an exemplary embodiment.

FIG. 5 depicts a flowchart of routing messages in a broadband gateway 500, according to an exemplary embodiment. The exemplary method 500 is provided by way of example, as there are a variety of ways to carry out methods disclosed herein. The method 500 shown in FIG. 5 may be executed or otherwise performed by one or a combination of various systems. The method 400 is described below as carried out by the system 100 shown in FIG. 1 by way of example, and various elements of the system 100 are referenced in explaining the example method of FIG. 5. Each block shown in FIG. 5 represents one or more processes, methods, or subroutines carried in the exemplary method 500. A computer readable media comprising code to perform the acts of the method 500 may also be provided.

Referring to FIG. 5, one or more inbound messages 502 that have been parsed may arrive at the router module 130 for distribution. In one embodiment, the router module 130 may route service orders to various appropriate destinations by defining message flow 504. For example, this may be achieved by providing a routing directory routing definitions which may be persisted and retrieved from a repository such as a database or a directory. Additionally, the one or more parsed messages 502 may be defined as one or more outbound message types 506 for distribution to one or more outbound transformer queues 508.

In one embodiment, the router module 130 may also include a message driven distributed architecture, such as JMS. In another embodiment, load may be distributed across multiple JVM architecture using message-oriented middleman (e.g., MOM). Other various architectural platforms may also be provided.

Message routing in a broadband gateway 100 (e.g., BAAIS) may be achieved by deploying various rules contained in a routing engine (not shown) in the router module 130. Different kinds of rules may yield different kinds of actions on different types of messages. Rules governing routing may be immutable once the router module 130 determines its value. The value for rules may be "true" or "false." Actions, therefore, are causation of changes based on rules and therefore function based on outcome of such rules. For example, if a rule outcome is "true," a resulting action may be that a system (e.g., System A) is alerted. However, if a rule outcome is "false," another system or systems (e.g., System B or C) may be notified. Accordingly, actions are performed at the instant the value of the corresponding rules are evaluated. It should be appreciated that these determinations are calculated at the various components of the BAAIS gateway 100, but appear "instantaneous" to service clients. It should also be appreciated that the router module 130 may be dependent on various internal components of the BAAIS gateway 100. Other various embodiments may also be provided.

Messages may be classified in several ways. Event Types may be one way to logically name inbound and outbound messages entering and leaving the BAAIS gateway 100. This way of providing identifier tags (e.g., Event Types) for messages may help to associate Parser and/or Transformer classes to process messages. Furthermore, providing identifier tags may also make it possible to route rules and definitions so that they may be tied to Event Types for routing messages in desired manner. Event Types may be stored in inbound-outbound message mapping tables. In one embodiment, the Event Types may be mapped with a Rule ID for each Type of message type, as depicted in TABLE 1 below.

TABLE 1

| In Event Type | Out Event Type | Destination System | Rule ID |
|---|---|---|---|
| OrderAddEvent | OrderNotifyEvent | System A | Rule A |
| OrderAddEvent | OrderRecordEvent | System B | Rule B |
| OrderAddEvent | OrderTaskEvent | System C | Rule C |

Other various Event Types may also be provided, such as OrderUpdateEvent, OrderRejectEvent, etc.

Rules attributes may be dynamic values associated with one or more messages (which need to be routed). For example, these may include PRODUCT, SYSTEM, ORDER TYPES, STATUS, etc. A rules engine may further assign values to these rules attributes for additional evaluation. A rules engine may also function as a central component for storing, parsing, and validating rules, and setting up a system based on these rules. Routing rules of the router module 130 may by cached in memory to provide optimal performance on peak load. In this example, the router module 130 may include a routing engine supported by lexical parsing based on truth statements. For example, the routing engine may provide a generic in-bound message type mapping to an outbound event map based on in-bound parsed data, e.g., Order Type, Order System, Order Service, etc. Accordingly, the routing engine may be a central component for all region and message types. Furthermore, the routing engine may also define one or more out-bound message types based on in-bound messages.

As discussed above, one example of lexical parsing utilized to generate rules and rule outcomes may be provided as:

```
((PRODUCT=DSL) AND
    (SOURCE_SYSTEM=SGW AND
    ORDER_TYPE=ADD AND
    STATUS=JEOPARDY))
```

Accordingly, lexical parsing may then generate the following outcome:

```
(TRUE) AND (TRUE AND FALSE AND TRUE)
    →outcome as FALSE.
```

Additionally, various user interfaces may also be provided to manage rule creation and Event Type mapping with rules and attributes.

Various operators, expressions, and rules (facts) may also be used. These may include, but not limited to EQUALS, NOT_EQUALS, MATCHES, AND, OR, LESS_THAN, GREATER_THAN, OPEN_BRACKET, CLOSE-_BRACKET, etc. Once these rules have been loaded to an inbound message type (e.g., Event Type for inbound message), all the rules may be automatically parsed as one or more truth statement generated based on inbound message attributes one after another. For example, this may be expressed as follows:

```
((PRODUCT=DSL) AND
    (SOURCE_SYSTEM=SGW AND
    ORDER_TYPE=ADD AND
    STATUS=JEOPARDY))
```

Accordingly, lexical parsing may then generate following outcome:

```
(TRUE) AND (TRUE AND TRUE AND TRUE)
    →outcome as TRUE
```

Once the outbound messages have been distributed by the router module 130, the one or more outbound transformer queues 508 may receive the messages to begin a message transforming process. Other various embodiments may also be provided.

Figure 6:
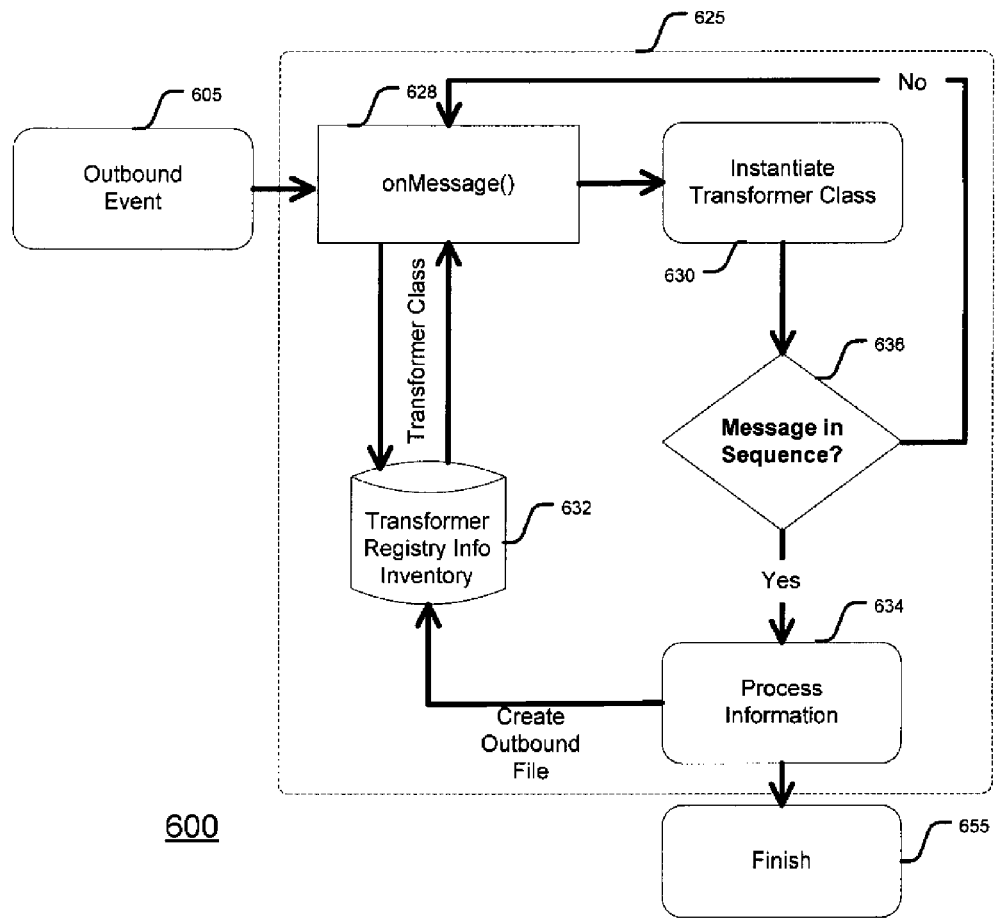
FIG. 6 depicts a flowchart of transforming messages in a broadband gateway, according to an exemplary embodiment.

FIG. 6 depicts a flowchart of transforming messages in a broadband gateway 600, according to an exemplary embodiment. The exemplary method 600 is provided by way of example, as there are a variety of ways to carry out methods disclosed herein. The method 600 shown in FIG. 6 may be executed or otherwise performed by one or a combination of various systems. The method 600 is described below as carried out by the system 100 shown in FIG. 1 by way of example, and various elements of the system 100 are referenced in explaining the example method of FIG. 6. Each block shown in FIG. 6 represents one or more processes, methods, or subroutines carried in the exemplary method 600. A computer readable media comprising code to perform the acts of the method 600 may also be provided.

The transforming logic 625 may further include several components. For example, an onMessage( ) 628 may be an entry point for transforming and may obtain a transformer class for the order messages 605 being processed. An Instantiate Transformer Class 630 may load a transformer class. A Transformer Registry Inventory 632 may be a repository, e.g., one or more data storage systems or databases, for storing contents of order messages 605 being transformed. A Process Information 634 may be the core step and/or component where parsing occurs. Other various embodiments may also be provided.

Messages 605 may also be transformed in sequence. For example, utilizing a message sequencing function 636 such as OutboundCreateTime (e.g., as established in a previous routing step) may help ensure that steps happen in proper order. Another example may include establishing a PVC before testing the PVC. Other various actions may also be provided.

In addition, if the message format and/or content is the same for multiple outbound messages (e.g., CDI messages), the transformer module 140 may also protect against duplicate transformation. In another embodiment, the transformer module 140 may utilize application server clustering to distribute load across multiple JVM, such as using message-oriented middleman (e.g., MOM), which may achieve optimum resource utilization. Other various embodiments may also be provided.

After messages 605 are passed through the transformer module 140, the notifier module 150 may retrieve the processed messages 655 for completing the provisioning process.

Figure 7:
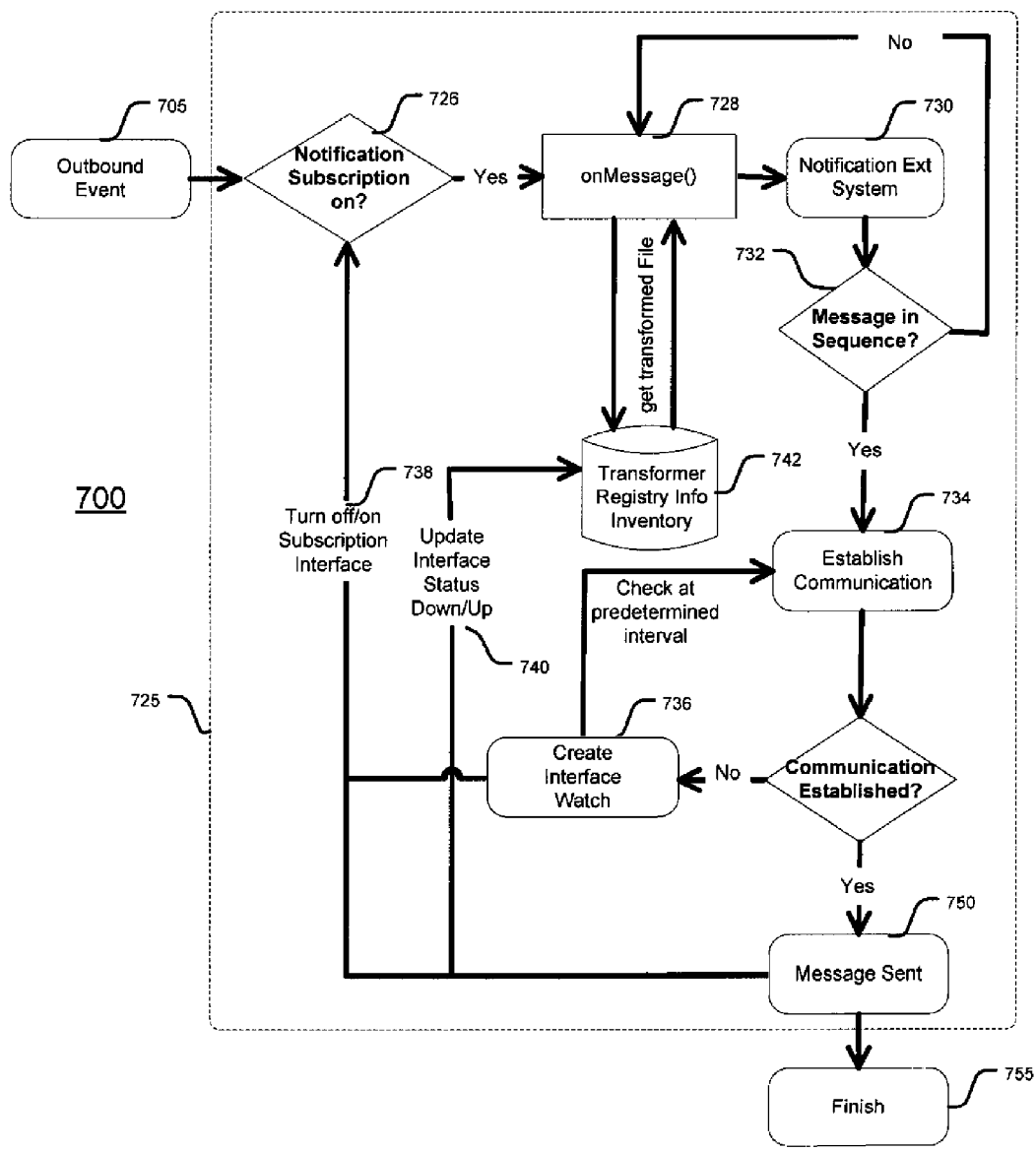
FIG. 7 depicts a flowchart of dispatching messages in a broadband gateway, according to an exemplary embodiment.

FIG. 7 depicts a flowchart of dispatching messages in a broadband gateway 700, according to an exemplary embodiment. The exemplary method 700 is provided by way of example, as there are a variety of ways to carry out methods disclosed herein. The method 700 shown in FIG. 7 may be executed or otherwise performed by one or a combination of various systems. The method 700 is described below as carried out by the system 100 shown in FIG. 1 by way of example, and various elements of the system 100 are referenced in explaining the example method of FIG. 7. Each block shown in FIG. 7 represents one or more processes, methods, or subroutines carried in the exemplary method 700. A computer readable media comprising code to perform the acts of the method 700 may also be provided.

Referring to FIG. 7, the notifier module 150, for example, may retrieve the outbound event 705 (e.g., from the transformer module 140) and follow a dispatch logic 725 to disseminate outbound event messages 755. The dispatch logic 725 may further include several components and/or steps. For example, after verifying that a Notification Subscription 726 is ON, an onMessage( ) 728 may obtain message content for an event being processed. A Notification Ext System 730 may then check if messages are in sequence 732 (as discussed above), and if this is verified, the Notification Ext System 730 may establish at least one communication 734 to deliver the one or more messages 750. However, if communications cannot be established, an Interface Watch 736 may be invoked and one or more attempts may be made to establish communication at a predetermined interval (e.g., 5 minutes or less). Additionally, the Notification Subscription 726 may be turned OFF 738 and an Interface Status may also be marked as DOWN 740. Once communication is established, the Notification Subscription 726 may be turned back ON 738 and the Interface Status may be marked as UP 740. As discussed above, a Transformer Registry Inventory 742 may be a repository, e.g., one or more data storage systems or databases, for storing contents of order messages 705 being transformed.

Similar to the adapter module 120, the notifier module 150 may support the following formats/protocols to dispatch outbound messages: CORBA, JMS/MQ, HTTPS, SOAP/WSDL, SMTP, FTP, etc. Notification channels of the notifier module 150 may include a per interfacing system. Here, notification support strategy for service license agreements (SLAs) may be included to watch which timeout on an interface in the event there is failure to respond in a predetermined (configured) time. In another embodiment, sequencing logic may be implemented to ensure that outbound messages 755 are delivered to external systems in a predetermined order, such as the manner the service requests were initially received. Furthermore, these outbound notification messages 755 may be transmitted to the original sender of the service order or to BAAIS regional centers (not shown) for distribution. Additionally, the outbound messages 755 may include Acceptance, Assignment, Activation, Completion, or other similar messages to indicate notification status. Other various embodiments may also be provided.

Figure 8:
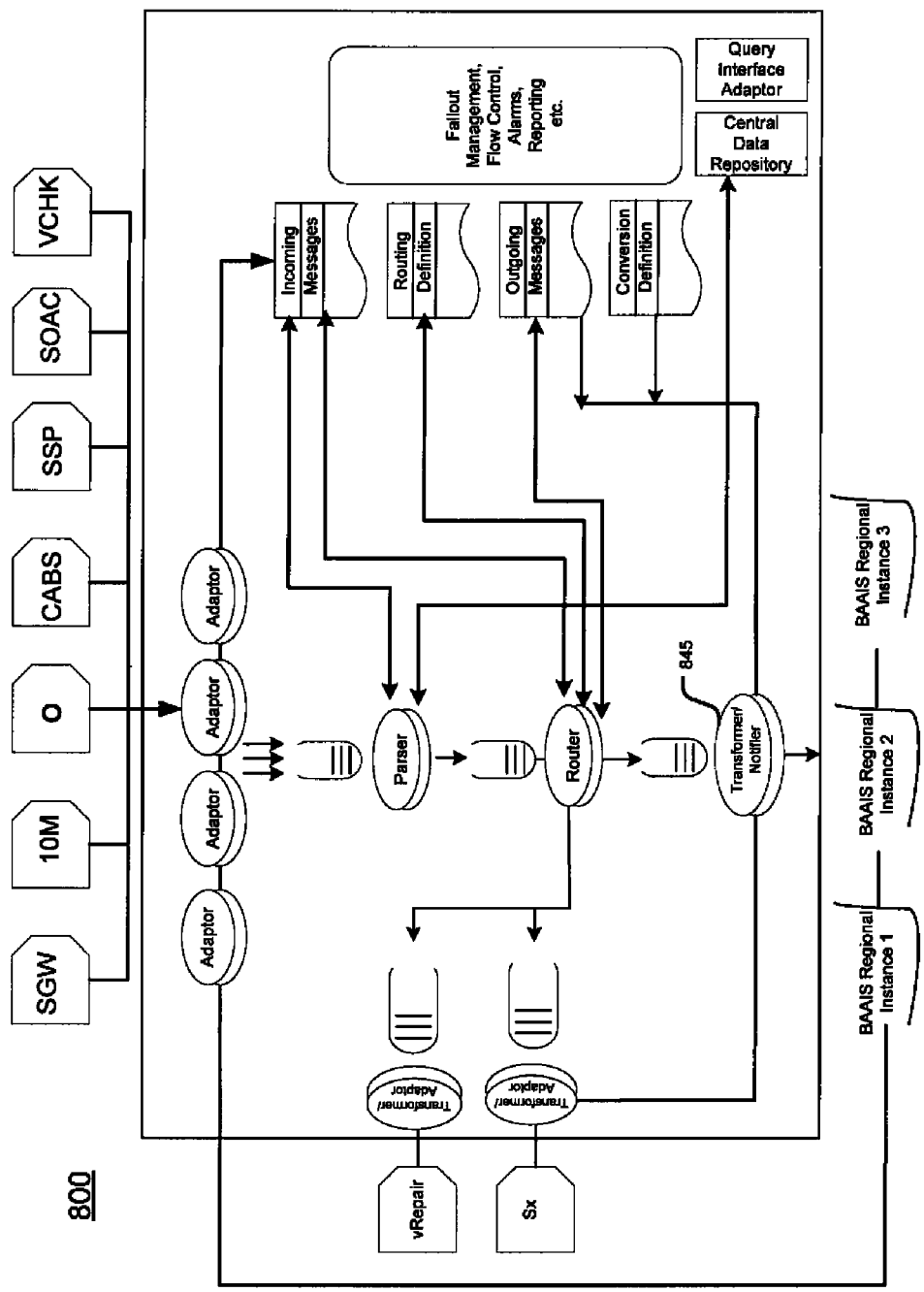
FIG. 8 depicts a flowchart of a broadband gateway, according to an exemplary embodiment.

Although each of the modules of the broadband gateway 100 is depicted as a single module in FIG. 1, it should be appreciated that these modules may be combined into greater or fewer numbers. For example, FIG. 8 depicts an architecture of a broadband gateway 800, according to an exemplary embodiment. In this example, rather than having a separate transformer module and a separate notifier module, the broadband (e.g., BAAIS) gateway 800 has a transformer/notifier module 845. The transformer/notifier module 845 may perform all of the functions and features of a separate transformer module and a separate notifier module. By combining modules, in this case the transformer and notifier module, the broadband gateway 800 may be more streamlined and efficient in processing messages. The broadband gateway 800 may also be better suited to adapt to various physical settings depending on space availability or limitations of data centers. In one embodiment, the modules of the broadband gateway 100 may be local, remote, or a combination thereof to each of the other modules. Other various embodiments may also be provided.

It should also be appreciated that the modules of the broadband gateway 100 may be coupled to one or more data storage systems and/or servers (not shown). In one embodiment, the one or more data storage systems and/or servers, which may be coupled to one or more of the modules described above, may store and process relevant information received from one or more service clients and/or other message senders. Exemplary database and processing information may include requests for broadband service, such as DSL, but may also include other similar information, such as provisioning of other services. Although databases and/or servers are not shown, it should be appreciated that the contents of these databases and/or servers may be combined into fewer or greater numbers of databases and may be stored on one or more data storage systems and/or servers. Furthermore, the databases and/or servers may be local, remote, or a combination thereof to each other. Additionally, the databases and/or servers may also store additional relevant information, such as metadata or personal service client information, which may further relate to provisioning or other similar services. Other variations may also be provided.

It should also be appreciated by one of ordinary skill that each of the modules, data storages systems, and/or servers may include one or more processors (not shown) for processing inbound and outbound messages. The data and/or information in each of the one or more messages or orders may be processed for storage, indexing, interpretation, and/or conversion (transformation) by one or more processors of the broadband modules. Other various embodiments may also be provided.

Storing, indexing, interpreting, and/or converting the data/information in one or more of the message at the one or more modules of the broadband gateway 100 may allow use of the same data/information by multiple modules. Such use may be sequential or simultaneous. Furthermore, processing the data/information in this way may also allow the processing logic to cross-reference the various data/information for efficient use by the system. Other various embodiments may also be provided.

Embodiments of message processing by broadband gateway may provide several advantages. For example, a variety of different types of formats and protocols may be serviced. As discussed above, the adapter module 110 and the notifier module 150 may support a variety of formats/protocols (e.g., WSDL/SOAP, XML, MQ, JMS, HTTPS, FTP, SMTP, CORBA, TOPCOM, etc.) from a variety of various external systems and/or modules (e.g., SGW, 10M, O, CABS, SSP, SOAC, VCHK, LFAC, SWITCH, IOM, SOM, IVAP, etc.). This enables the broadband gateway to improve communication for various service clients.

Another advantage of the broadband gateway for message processing is that a decoupled architecture is provided. The fact that there are at least five distinct modules, each one being decoupled to each other, a BAAIS gateway, for example, may provide asynchronous modules that are capable of performing functions independent of other modules or other network components. Such a structure not only provides improved flexibility, but also a more streamlined approach to provisioning. In fact, a decoupled architecture may provide greater reliability.

For example, load balancing, scalability, and improved data recovery may also be achieved through this structure. By spreading the work (load balancing) between many modules, servers, computers, processors, data storage systems, and/or other similar components, resource utilization may be optimized. In addition, load balancing may provide overall decreased computing time, ultimately providing improved provisioning and related services to various customers and clients.

Furthermore, having asynchronous handoff capabilities may also provide a beneficial scalability feature. For example, the fact that the various modules, servers, computers, processors, data storage systems, and/or other similar components needed to provision and activate broadband services remains unfixed, the BAAIS gateway may possess less or more of any one of these components on an as needed basis to further improve efficiency and resource utilization.

Another benefit of a decoupled structure may include enhanced data recovery and decreased error rates. For example, as soon as a module complete its job, it passes the one or more messages to the next module to pick up whenever it is ready to perform its job. This creates a more seamless processing of messages and minimizes potential hiccups or error signals along the way. As a result, the quality of processing messages may not be lost to the quantity of messages ordered for processing.

Advantages in business and marketing may also be apparent. For example, having a customer-friendly design for receiving messages and sending notifications in various formats and/or protocols may decrease incompatibility issues and improve quality of service. Moreover, optimizing network resource utility may provide more efficient and reliable provisioning. Accordingly, the broadband gateway structure described above provides a substantial business and marketing advantage that conventional systems and techniques simply cannot offer.

Figure 9:
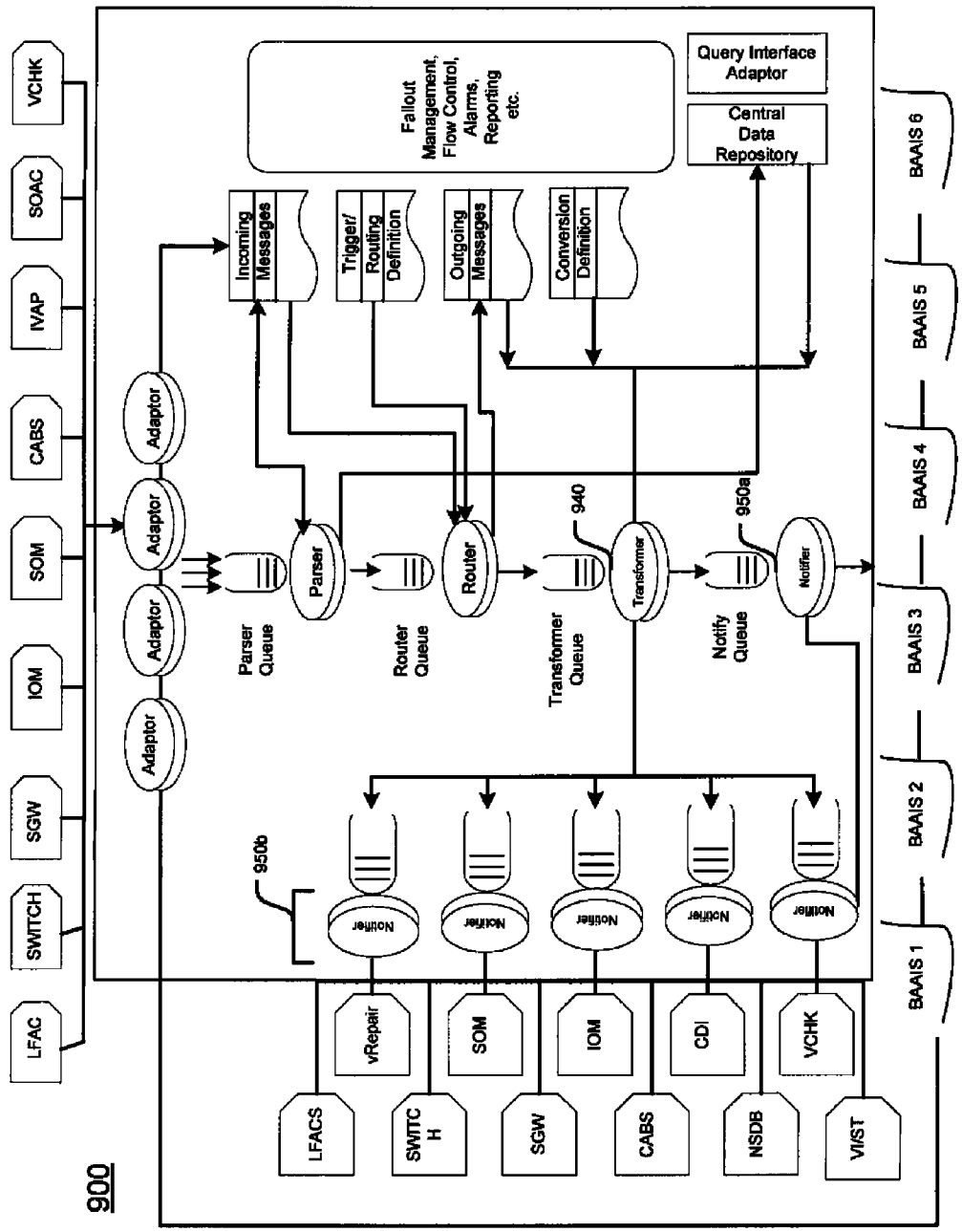
FIG. 9 depicts a flowchart of a broadband gateway, according to an exemplary embodiment.

FIG. 9 depicts an architecture of a broadband gateway 900, according to an exemplary embodiment. In this example, a transformer module 940 may transmit outbound messages to one or more notifier modules 950*a*, 950*b*. Multiple notifier modules 950*a*, 950*b* may provide message notification to a variety of recipients. In one embodiment, a notifier module 950*a* may provide notification to one or more additional broadband gateways, e.g., BAAIS 1, BAAIS 2, etc. In this example, the additional broadband gateways may be regionally situated for further processing the one or more message orders for dissemination to respective service clients within that particular region. In another embodiment, a notifier module 950b may provide direct notifications in a variety of formats/platforms to other service clients or for additional repairs, as depicted in FIG. 9. In yet another embodiment, a notifier module 950a may transmit message to multiple parties, such as to a broadband regional gateway or service client, as depicted in FIG. 9. Accordingly, such a broadband gateway structure 900 may provide a more flexible approach to provisioning, especially one that is capable of providing greater efficiency message delivery.

Figure 10:
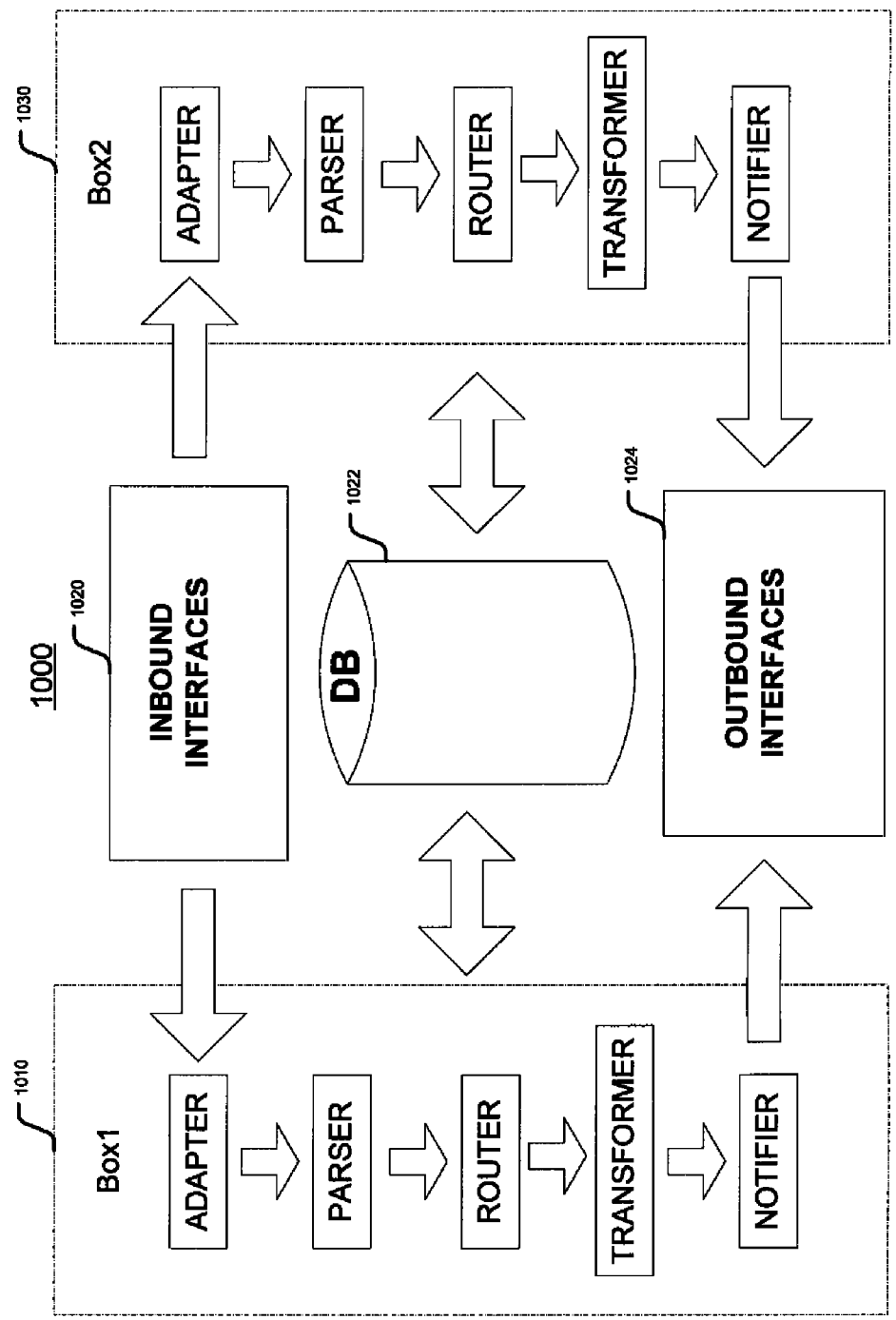
FIG. 10 depicts a flowchart of a broadband gateway, according to an exemplary embodiment.

FIG. 10 depicts an architecture of a broadband gateway 1000, according to an exemplary embodiment. In this example, a first broadband gateway (Box 1) 1010 may interact with external inbound interfaces 1020, external databases 1022, and external outbound interfaces 1024. A second broadband gateway (Box 2) 1030 may also interact with the external inbound interfaces 1020, the external databases 1022, and the external outbound interfaces 1024. It should be appreciated that FIG. 10 depicts a gateway architecture in a multi-JVM environment and a multi-JVM, multi-box (clustered) environment that may allow applications to operate in a load balanced and redundant, high availability configuration with potential to scale as needed as the load increases.

Figure 11:
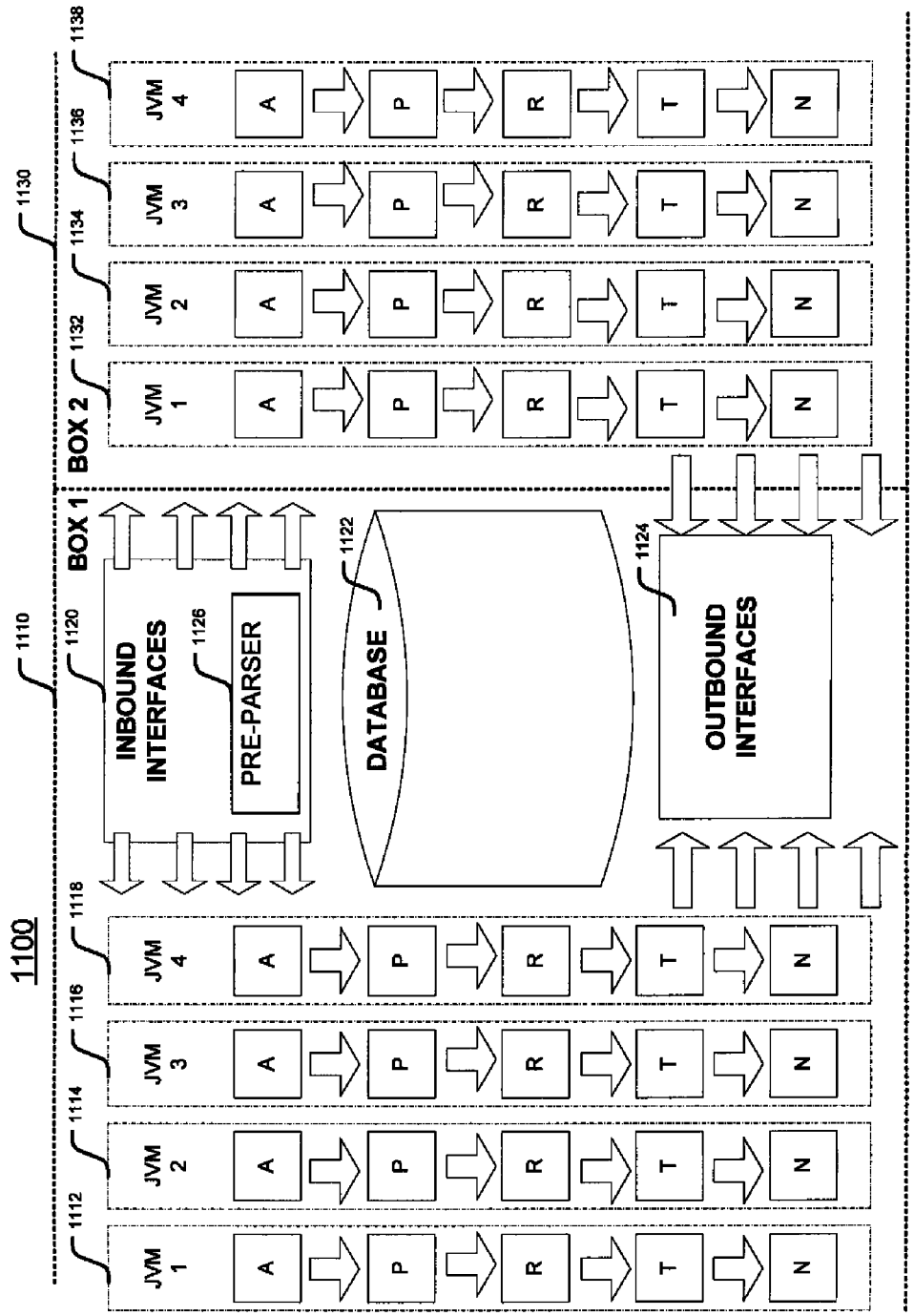
FIG. 11 depicts a flowchart of a broadband gateway, according to an exemplary embodiment.

FIG. 11 depicts a flowchart of a broadband gateway 1100, according to an exemplary embodiment. In this example, Box 1 1110 may include a first set of BAAIS gateways 1112, 1114, 1116, 1118 that communicate with inbound interfaces 1120, databases 1122, and outbound interfaces 1124 that are all internal or local to Box 1 1110. Box 2 1130 may include a second set of BAAIS gateways 1132, 1134, 1136, 1138 that communicate with the inbound interfaces 1120, the databases 1122, and the outbound interfaces 1124. It should be appreciated that FIG. 11 depicts a gateway architecture in a multi-JVM environment and a multi-JVM, multi-box (clustered) environment that may allow applications to operate in a load balanced and redundant, high availability configuration with potential to scale as needed as the load increases.

Since the role of each of the broadband gateway components is well-defined, the modules and corresponding components may therefore provide services available to each other in a controlled and secure manner. In addition, since the broadband gateway as described above uses heterogeneous communication protocols that stress location transparency and interoperability, it may better serve clients' requests and orders. Embodiments of the broadband gateway provide the ability to incrementally extend the initial deployment to reflect evolving requirements and may therefore also integrate additional systems. Another beneficial feature of embodiments of the BAAIS gateway may include an infrastructure that has capabilities to route and deliver service requests message to the correct service provider in sequence.

While the features and functionalities of the broadband gateway and message processing modules are primarily discussed with respect to the embodiments above, it should be appreciated that the features and functionalities of one embodiment may be similarly applied to other embodiments. Furthermore, while provision and activation of broadband services discussed above pertain to DSL, it should be appreciated by one skilled in the art that the functions and features of the program information menu may apply similarly to other types of broadband provisioning or other similar communication services as well, where applicable. Other variations may also be provided.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
  receiving two or more messages at a receiver of a gateway;
  parsing, at a parser, the two or more messages by lexical parsing based on truth statements for processing in a distributed architecture configured both to distribute load across one or more application server instances while providing a single virtual interface, and distribute the two or more messages to a parsing queue, wherein parsing the two or more messages includes using geographical region specific parsing classes;
  storing the two or more messages in one or more databases;
  identifying, at a processor, a processing sequence for the two or more messages based on the parsing, wherein identifying the processing sequence for the two or more messages further comprises determining whether to use parallel processing, sequential message delegation, or both; and
  retrieving, by the processor, the two or more messages for processing without database polling based on the identified processing sequence.

2. The method of claim 1, further comprising providing the two or more messages for further processing at one or more external systems.

3. The method of claim 1, further comprising providing broadband network service in the identified processing sequence to one or more customers.

4. The method of claim 3, wherein the broadband network service is DSL service.

5. The method of claim 1, wherein receiving the two or more messages comprises receiving the two or more messages from one or more external systems.

6. The method of claim 1, wherein identifying a processing sequence for the two or more messages is further based on at least one of time of delivering, sending source, transaction or entity type, assigned or order number, and independent rule.

7. The method of claim 6, wherein the independent rule is based on a business or administrator rule.

8. A non-transitory computer readable medium encoded with computer executable instructions to perform the acts of the method of claim 1.

9. A system, comprising:
  at least one receiver configured to receive two or more messages;
  at least one parser configured to parse the two or more messages by lexical parsing based on truth statements for processing in a distributed architecture configured both to distribute load across one or more application server instances while providing a single virtual interface, and distribute the two or more messages to a parsing queue, wherein the parser is further configured to use geographical region specific parsing classes;
  at least one data storage system configured to store the two or more messages;
  at least one identifier configured to identify a processing sequence for the two or more messages based on the parsing of the two or more messages, wherein the at least one identifier is further configured to determine whether to use parallel processing, sequential message delegation, or both for processing the two or more messages; and at least one retriever configured to retrieve the two or more messages for processing without database polling based on the identified processing sequence.

10. A system of claim 9, wherein the receiver receives the two or more messages from one or more external systems.

11. A system of claim 9, wherein the at least one identifier identifies a processing sequence for the two or more messages based on at least one of time of delivering, sending source, transaction or entity type, assigned or order number, and independent rule.

12. A system of claim 11, wherein the independent rule is based on a business or administrator rule.

13. A method, comprising:

receiving, at a receiver of a computing device, and storing, in one or more databases communicatively coupled to the computing device, two or more messages based on an identified processing sequence, wherein the identified processing sequence is based at least in part on lexical parsing of the two or more messages using truth statements, wherein the lexical parsing incorporates geographical region specific parsing classes;

processing, at a processor of the computing device, the two or more messages in a distributed architecture based on the identified processing sequence without database polling, wherein the distributed architecture is configured both to distribute load across one or more application server instances while providing a single virtual interface, and distribute the two or more messages to a parsing queue, wherein processing the two or more messages further comprises determining whether to use parallel processing, sequential message delegation, or both; and delivering, by a transmitter of the computing device, the two or more messages for further processing in the distributed architecture based on the identified processing sequence.

14. The method of claim 13, further comprising providing broadband network service in the identified processing sequence to one or more customers.

15. The method of claim 14, wherein the broadband network service is DSL service.

16. The method of claim 13, wherein receiving and storing the two or more messages comprises receiving the two or more messages from one or more external systems.

17. The method of claim 13, wherein receiving and storing the two or more messages in the identified processing sequence comprises tagging the two or more messages based on at least one of time of delivering, sending source, transaction type, assigned number, and independent rule.

18. The method of claim 13, wherein the independent rule is based on a business or administrator rule.

19. A non-transitory computer readable medium encoded with computer executable instructions to perform the acts of the method of claim 13.

20. A system, comprising:

at least one receiver configured to receive and store, in one or more data storage systems, two or more messages based on an identified processing sequence, wherein the identified processing sequence is based at least in part on lexical parsing of the two or more messages using truth statements, wherein the lexical parsing incorporates geographical region specific parsing classes;

at least one processor configured to process the two or more messages in a distributed architecture based on the identified processing sequence, wherein the distributed architecture is configured both to distribute load across one or more application server instances while providing a single virtual interface, and distribute the two or more messages to a parsing queue, wherein the least one processor is further configured to determine whether to use parallel processing, sequential message delegation, or both for processing the two or more messages; and at least one transmitter configured to deliver the two or more messages for further processing in the distributed architecture based on the identified processing sequence.

21. A system of claim 20, wherein the receiver receives the two or more messages from one or more external systems.

22. A system of claim 20, wherein the at least one identifier identifies a processing sequence for the two or more messages based on at least one of time of receipt, time of delivering, sending source, transaction type, assigned number, and independent rule.

23. A system of claim 22, wherein the independent rule is based on a business or administrator rule.

* * * * *